United States Patent [19]

Nardelli et al.

[11] Patent Number: 5,376,393
[45] Date of Patent: Dec. 27, 1994

[54] REMOVAL OF PHOSPHOROUS FROM MAMMALIAN MILK USING ION EXCHANGE

[75] Inventors: Christy A. Nardelli, Westerville; Terrence B. Mazer, Reynoldsburg; Arthur J. C. L. Hogarth, Columbus; John D. Suh, Gahanna, all of Ohio; Leona M. Pickett, Caledonia, Ill.; Harold W. Keller; William J. Nelson, both of Rockford, Ill.

[73] Assignee: Abbott Laboratories, Abbott Park, Ill.

[21] Appl. No.: 200,061

[22] Filed: Feb. 22, 1994

Related U.S. Application Data

[63] Continuation-in-part of Ser. No. 986,658, Dec. 8, 1992, abandoned.

[51] Int. Cl.$^5$ .............................................. A23C 7/04
[52] U.S. Cl. ..................................... 426/271; 210/683
[58] Field of Search ................. 210/670, 683; 426/271

[56] References Cited

U.S. PATENT DOCUMENTS

| 4,663,172 | 5/1987 | Wenner | 426/271 |
| 4,968,513 | 11/1990 | Watanabe et al. | 426/42 |
| 5,213,835 | 5/1993 | Nardelli et al. | 426/271 |

FOREIGN PATENT DOCUMENTS 46-25697  7/1971  Japan.

*Primary Examiner*—Ivars Cintins
*Attorney, Agent, or Firm*—Lonnie R. Drayer; Donald O. Nickey

[57] ABSTRACT

A novel process for the removal of phosphorous from mammalian milk, preferably bovine skim milk, has been developed. The process involves passage of the milk at an elevated temperature through a Type I or Type II macroporous or gel type strong base ion exchange material in the chloride or carbonate form. The weak base anion sites inherent to the ion exchange material have been neutralized. The ion exchange material can easily be regenerated.

13 Claims, No Drawings

REMOVAL OF PHOSPHOROUS FROM MAMMALIAN MILK USING ION EXCHANGE

This is a continuation-in-part of application Ser. No. 07/986,658 filed Dec. 8, 1992, now abandoned.

FIELD OF THE INVENTION

The present invention relates to a method of removing phosphorus from mammalian milk using ion exchange technology.

BACKGROUND OF THE INVENTION

It is believed to be nutritionally advantageous to provide nutritional products for human newborns and infants which have a ratio of calcium to phosphorus that mimics the ratio in human milk. Condensed skim bovine milk is often used as a source of protein in such nutritional products, but naturally contains more phosphorus than is desired in such products. There is provided in accordance with the present invention a method of using ion exchange technology to remove phosphorus from mammalian milk to alter the ratio of calcium to phosphorus in the milk.

PRIOR ART

U.S. Pat. No. 4,968,513 teaches a process for preparing "phosphorous reduced" cow milk. However, this process does not involve the use of ion exchange technology, and in fact teaches that ion exchange technology is inappropriate for this purpose because important nutrients will be removed from the milk. This problem is overcome by the process of the present invention as will be shown in the detailed description of the present invention.

Japanese Patent Publication Sho 46-25697 is cited in the text of U.S. Pat. No. 4,968,513. This document teaches the use of ion exchange technology in a process that is substantially different from the present invention. This prior art process involves dissolution of the casein portion of milk in an alkaline solution (pH10), while the present invention does not involve alkaline dissolution or any other pH treatment of the starting material prior to contact with an ion exchange material. This prior art process includes heating a casein solution to 60°–150° C., then cooling the casein solution to 50° C. prior to ion exchange treatment. The method of the present invention prefers the milk to be at a temperature of at least 60° C. while the milk is exposed to the ion exchange material. This prior art process uses both cationic and anionic ion exchange treatment, with the resins in the hydrogen and hydroxide form. The method of the present invention involves only anion exchange with the ion exchange material being in the chloride form or sulfate form, carbonate form, and/or free base form.

U.S. Pat. No. 4,663,172 relates to a process for the production of skimmed milk having reduced phosphate and calcium contents. This prior art process involves acidifying the skimmed milk to a pH of 5.2 to 6.0 and then passing it over an ion exchanger. By acidifying the skimmed milk and adding citrate both phosphorous and calcium are removed such that the calcium to phosphorous ratio is actually reduced, as opposed to the present invention wherein said ratio is increased. The product of the prior art process has the following undesirable characteristics: (a) the resulting product must be refortified with calcium to obtain an appropriate calcium content for many nutritional uses; (b) the resulting product has a reduced calcium to phosphorous level of about 1:1; and (c) the resulting product must be neutralized to obtain a pH appropriate for use in nutritional products.

DETAILED DESCRIPTION OF THE INVENTION

All experimental work was conducted in a column mode using a minimum of 61 cm (24 inches) of resin in a 2.54 cm (one inch) diameter glass water-jacketed column. With the exception of initial experiments 1 through 3, all experiments were performed in a downflow mode at 20 ml/min (0.48 gpm/cu ft). As used herein and in the claims "column mode" is understood to be a procedure in which an ion exchange material is located in a column having both inlet and outlet ports, and mammalian milk enters the column through the inlet port, passes through the ion exchange material and exits the column through the outlet port. As used herein and in the claims "upflow mode" is understood to be a column mode process in which the column is oriented substantially vertically and the mammalian milk enters the column via an inlet port located at or near the bottom of the column and exits the column via an outlet port located at or near the top of the column. As used herein and in the claims "downflow mode" is understood to be a column mode process in which the column is oriented substantially vertically and the mammalian milk enters the column via an inlet port located at or near the top of the column and exits the column via an outlet port located at or near the bottom of the column. The column resin and feed system were kept at a constant temperature as specified using temperature-controlled water circulated through the water jacket.

The regeneration sequence for the ion exchange material in Experiments I through XII was always performed at a flow rate such that the resin was in contact with a sodium hydroxide regenerant for a minimum of thirty minutes. As used herein and in the claims the term "ion exchange material" is understood to include both gel and macroporous type strong base anion exchange resins having strong base sites and weak base sites. Deionized water was used for all slow rinses, fast rinses, and backwash processes. A fifteen minute slow rinse with deionized water was also included. A fast rinse with deionized water always followed the slow rinse to a conductivity of 200 micromhos or less. The final fast rinse (before the service cycle) was again performed with deionized water to a final conductivity of less than 50 micromhos. Regenerant chemicals were made using C.P. grade (or equivalent) diluted to preferred concentrations using deionized water.

Mineral concentrations were determined using atomic absorption spectrophotometry and inductively coupled argon plasma spectroscopy. Protein determinations were performed using a Tecator Kjeldahl protein method similar to AOAC method 984.27. Chloride levels were determined using a Metrohm potentiometric method or x-ray fluorescence spectroscopy. Total solids were determined using Mojonnier techniques.

EXPERIMENT I

An initial experiment was conducted to determine if phosphorus could be removed from condensed skim bovine milk (CSM) using ion exchange technology. All of the experiments described herein used bovine milk having a pH of about 6.8, but it is believed that the method of removing phosphorous described herein may be employed using any mammalian milk as a starting material. 312 ml (0.011 cubic feet) of a strong base Type II macroporous anion exchange resin, "IRA 910" (available from Rohm and Haas, Independence Mall West, Phila., Pa. 19105 USA) was placed in a 2.54 cm (1 inch) water-jacketed column heated to 60° C. As used herein and in the claims a "Type II" anion exchange resin is understood to mean a quaternary ammonium type of resin in which the four substituents on the nitrogen atom are a polymeric benzyl, two methyl groups, and an ethanol group. The column contained a 2.54 cm (one inch) support bed of graded quartz and was topped with a layer of polystyrene beads to prevent resin loss. The resin was conditioned with 375 ml of 5% hydrochloric acid, slow rinsed with 375 mls of deionized water, and conditioned with 770 ml of 1.5% sodium carbonate. A final fast rinse with deionized water was used until the resulting effluent reached a conductivity of less than 50 micromhos. The starting material was condensed skim milk "as is" (approximately 30% total solids) which was fed through the 60° C. column in an upflow mode at a flow rate of approximately 20 ml/min. Six liters of CSM were collected at liter intervals. As used herein and in the claims "skim milk" means mammalian milk from which a majority of the butter fat has been removed. While skim milk is a preferred starting material it is believed that whole mammalian milk may be used as a starting material, but the milk fat may cause the process to be less efficient by plugging sites and/or pores in the ion exchange material.

Several interesting observations were made from this experiment. The initial effluent through the column (the first 100 ml) appeared clear, and the next 50-100 ml appeared to be slightly white and opaque. A yellow clear liquid was evident for the next 100 ml, followed by a thick yellow opaque liquid. Mineral analysis from the initial aliquot showed only a slight decrease in phosphorus level (less than 10%), and since these resulting products appeared to be unsuitable for use in a nutritional product, no further testing was done. Pressure drop across the column increased only slightly initially, 138 kPa (20 psi), then decreased to 55 kPa (8 psi by the end of the run). However, it was suspected that different results might be obtained with a more dilute CSM feed. Therefore, another experiment was run to determine the effects of ion exchange on diluted condensed skim milk.

EXPERIMENT II

Column and resin conditions for Experiment I were duplicated for Experiment II with respect to temperature, regeneration and conditioning cycle, amount and type of resin, flow mode, and flow rate. The starting material was condensed skim milk which was diluted from the 30% solids level as used in Experiment I to a 10% solids level. Six liters of the diluted CSM were run through the ion exchange column (IEX Column) and collected at liter intervals. Samples were analyzed for calcium, phosphorus, and protein concentrations.

Once again, unusual results were observed upon passage of the CSM through the ion exchange column. The initial liter collected was yellow and looked like whey, with no milky white appearance. The second liter appeared somewhat milkier than the first liter. However, the second liter still had a distinct yellow appearance. Remaining liters collected appeared as milky as the initial CSM fed through the column. Pressure drop throughout the run remained at less than 41 kPa (5 psi).

Analytical results for this experiment are presented in Table 1. Calcium:phosphorus ratios improved from 1.18 in the feed CSM sample to 1.62 in the initial liter, with very little calcium loss and significant phosphorus removal (34.2%). Additionally, protein recovery was approximately 90% for this initial aliquot. Upon further analysis using size exclusion chromatography and reverse phase HPLC, the next aliquot appeared to be primarily casein with alpha-lactalbumin and beta-lactoglobulin. Mineral analyses on subsequent aliquots showed significantly less phosphorus removal with a return to normal calcium:phosphorus ratios by the third liter (14% phosphorus removed in liter 2).

TABLE 1

| EXPERIMENT II - FEASIBILITY EXPERIMENT | | | |
|---|---|---|---|
| Liters Through IEX Column | % Calcium Removed | % Phosphorus Removed | Calcium: Phosphorus Ratio |
| STARTING MATERIAL | — | — | 1.18 |
| 1.25 | 10.4% | 34.2% | 1.62 |
| 3.25 | 17.0% | 14.0% | 1.08 |
| 5.25 | 8.2% | 0% | 1.15 |

EXPERIMENT III

Experiment III was designed to determine the effect of pH on the use of an ion exchange procedure to remove phosphorus from condensed skim milk. As lowering the pH of CSM starting material itself caused a curdling effect, it was decided to lower the pH of the resin bed. This was accomplished by reducing the amount of sodium carbonate used in the neutralization step by 50%. Other column parameters remained the same as in Experiments I and II. Condensed skim milk diluted to 10% total solids (as used in Experiment II) was once again used as the starting material. Samples collected at one liter intervals were subjected to calcium, phosphorus, total solids and protein determinations.

As shown in Table 2, the amount of phosphorus removed from the CSM starting material increased slightly as a result of a lower ion exchange bed pH. The calcium to phosphorus ratios increased to a level of 1.71 (37.5% phosphorus removed) in the first liter, and remained at 1.43 (21.4% phosphorus removed) for the second liter.

The capacity of the ion exchange resin to remove phosphorus was reached, however by the fourth liter aliquot through this process. Protein recovery was again satisfactory throughout the run, with an average protein recovery of 94.2%. The total solids recovery was an average of 93.5%, which is indicative of good carbohydrate recovery. Although lowering the pH of the resin bed improved phosphorus removal, satisfactory capacity of the ion exchange column to remove phosphorus had not yet been reached.

TABLE 2

| EXPERIMENT III - EFFECT OF LOWER pH | | | |
|---|---|---|---|
| Liters Through IEX Column | % Calcium Removed | % Phosphorus Removed | Calcium: Phosphorus Ratio |
| STARTING MATERIAL | — | — | 1.18 |
| 1.2 | 7.7% | 37.5% | 1.71 |
| 2.2 | 3.1% | 21.4% | 1.43 |
| 3.2 | 6.2% | 9.0% | 1.20 |

EXPERIMENT IV

New ion exchange resin "IRA910" was conditioned with sodium chloride (450 ml of 10% sodium chloride) and rinsed with deionized water in preparation for Experiment IV. 312 ml (0.011 cubic feet) of "IRA 910" was placed in the 2.54 cm (1 inch) diameter column on top of the quartz support. No polystyrene beads were placed at the top of the column, and the column was heated to 60° C. with the upflow water jacket. The starting material was CSM diluted to 10% total solids with water, heated to 60° C., and run through the column in a downflow mode at a flow rate of approximately 20 ml/min. Once again, sample aliquots were collected at liter intervals to be analyzed for calcium, phosphorus, and protein content.

Although pressure drop throughout the run remained below 41 kPa (5 psi), no significant improvement in phosphorus removal was seen in this downflow run when compared to the upflow process. Table 3 presents analytical data from this run. Phosphorus removal reached 39.2% for the first liter, but dropped to 28.3% by the second liter, and 9.2% by the third liter. Protein recovery was comparable to previous runs (87%). One of the most encouraging findings from this experiment was the apparent feasibility of utilization of a downflow process for passage of CSM through the ion exchange column. Since the capacity of the resin to remove phosphorus had not improved, however, it remained a significant factor to overcome for commercial process feasibility. In an attempt to improve the capacity of the resin to remove phosphorus, it was decided to examine the effect of temperature on phosphorus removal in the next experiment.

TABLE 3

EXPERIMENT IV - DOWNFLOW TRIAL

| Liters Through IEX Column | % Calcium Removed | % Phosphorus Removed | Calcium: Phosphorus Ratio |
|---|---|---|---|
| STARTING MATERIAL | — | — | 1.17 |
| 1.1 | 12.1% | 39.2% | 1.68 |
| 2.1 | 11.4% | 28.3% | 1.44 |
| 3.1 | 8.6% | 9.2% | 1.17 |

EXPERIMENT V

Experimental conditions for Experiment V. were identical to those established for Experiment IV. with the exception of an increase in the column and feed temperature to 66° C. Samples were collected at 500 ml intervals and were analyzed for calcium, phosphorus, total solids and protein content. To assure that no residual sodium remained in the rinse water (void spaces) the sodium level of the product was analyzed.

Results from CSM processed through the "IRA910" ion exchange column at 66° C. showed only a slight improvement in phosphorus removal and column capacity. As shown in Table 4 calcium to phosphorus ratios improved initially to 1.76 (37.8% phosphorus removed) through the initial liter, but decreased to 1.63 (33.9% phosphorus removed) through the second liter, and 1.22 (4.8% phosphorus removed) through the third liter. Sodium content did not significantly increase through the run. Sodium content in the feed was 45.7 mg/100 g, while the highest sodium measured (at 1.7 liters) was 46.1 mg/100 g. The protein recovery was greater than 94%, which is excellent. The total solids recovered was about 94%, which is indicative of good carbohydrate recovery. The capacity of the resin to remove phosphorus had not yet reached acceptable levels, however, so it was decided to investigate if the use of a different resin would improve this capacity.

TABLE 4

EXPERIMENT V - TEMPERATURE EFFECTS

| Liters Through IEX Column | % Calcium Removed | % Phosphorus Removed | Calcium: Phosphorus Ratio |
|---|---|---|---|
| STARTING MATERIAL | — | — | 1.20 |
| 0.7 | 8.8% | 40.2% | 1.83 |
| 1.2 | 9.6% | 35.4% | 1.68 |
| 1.7 | 11.2% | 32.4% | 1.58 |
| 2.2 | 15.9% | 37.0% | 1.62 |
| 2.7 | 3.2% | 7.8% | 1.26 |
| 3.2 | 3.2% | 2.0% | 1.18 |

EXPERIMENT VI

This experiment was designed to investigate whether a strong base anion exchange resin, having a greater total exchange capacity would have an increased capacity to remove phosphorous from condensed skim milk. 312 ml (0.011 cubic feet) of "IRA410" (Rohm and Haas) strong base anion exchange resin, gel type, was placed into a 2.54 cm (one inch) diameter water-jacketed column, conditioned with 450 ml of 10% sodium chloride, and rinsed with deionized water. Commercially available skim milk, containing 10% solids, was heated to 60° C., and run in a downflow mode through the heated (60° C.) column at a flow rate of approximately 20 ml/min. Aliquots were collected after passage of the CSM through the column at 500 ml intervals, and were analyzed for calcium, phosphorus, sodium, total solids and protein content.

It is to be noted that in this experiment skim milk (having about 10% solids, by weight) is the starting material, while in the other experiments condensed skim milk (30% solids, by weight) is often diluted to have 10% solids, by weight. Either starting material is acceptable, although on a commercial basis condensed skim milk may be more economical because of lower shipping costs due to its lower total weight.

As shown in Table 5 phosphorus removal dramatically improved in this experiment. The initial 500 ml aliquot showed an increase in calcium to phosphorus ratio of 2.37, with a phosphorous removal rate of 57.2%. A significant degree of phosphorus removal was still evident at three liters, with a calcium:phosphorus ratio of 1.39 (19.7% phosphorus removal). Calcium levels did not decrease significantly, nor did sodium levels (42.5 mg/100 g in the feed and effluent). Protein recoveries were greater than 95%, and pressure drop throughout the run reached no higher than 62 kPa (9 psig). The total solids recovered was about 93%, which is indicative of good carbohydrate recovery. The use of "IRA410" ion exchange gel definitely showed a dramatic improvement over the use of the "IRA910" ion exchange resin, and further experimentation was planned using this resin. However, it was decided to further evaluate another resin type before pursuing "IRA410" ion exchange gel optimizations.

TABLE 5

EXPERIMENT VI - MACROPOROUS GEL

| Liters Through IEX Column | % Calcium Removed | % Phosphorus Removed | Calcium: Phosphorus Ratio |
|---|---|---|---|
| STARTING MATERIAL | — | — | 1.20 |
| 0.7 | 15.3% | 57.2% | 2.37 |
| 1.2 | 7.6% | 42.9% | 1.94 |
| 1.7 | 9.2% | 37.8% | 1.77 |
| 2.2 | 10.2% | 33.4% | 1.62 |
| 2.7 | 9.3% | 25.7% | 1.47 |
| 3.2 | 6.8% | 19.7% | 1.39 |
| 3.7 | 5.9% | 14.1% | 1.32 |

EXPERIMENT VII

"IR122" (Rohm and Haas) strong acid cation exchange resin in the calcium form was used in this experiment. 312 ml (0.011 cubic feet) of "IR122" was loaded into a 2.54 cm (one inch) diameter column, conditioned with 450 ml 10% calcium chloride, and rinsed with deionized water to a conductivity of less than 100 micromhos. The starting material was condensed skim milk diluted to 10% total solids. The starting material was passed through the column at a temperature of about 60° C., at a flow rate of approximately 20 ml/min.

This run was aborted because of a high pressure drop of about 172 kPa (25 psig) on introduction of the first liter of starting material. The CSM curdled immediately upon contact with the resin and prevented any flow through the ion exchange column. Subsequent experiments were directed towards optimization with "IRA410" ion exchange resin, gel type, for proof of principle and phosphorus removal capacity improvements.

EXAMPLE VIII

This experiment consisted of three separate runs for proof of principle and reproducibility of phosphorus removal/protein recovery using "IRA410" TYPE II strong base anion exchange resin, gel type. All runs used 312 ml (0.011 cubic feet) of "IRA410" in a 2.54 cm (one inch) diameter water-jacketed column. All experiments used the conditioning cycles of sodium hydroxide, water rinses, hydrochloric acid, and final water rinse. The starting material was CSM diluted to 10% total solids. The starting material was fed through the column at 60° C. in a downflow mode at a flow rate of approximately 20 ml/min. Samples were collected at 500 ml intervals and were analyzed for calcium, phosphorus, total solids and protein content.

Results from all three runs were very similar, as seen in Table 6. Phosphorus removal in the first 500 ml aliquot ranged from 41% to 50%, and on the final 500 ml aliquot taken at 3.5 liters, from 23.8–23.9%. Mean phosphorus removal through 3.5 liters ranged from 33.9% to 34.2%, with a mean calcium to phosphorus ratio of 1.65 to 1.70. Protein recoveries were good with greater than 90% protein recovery for each run. The total solids recovered was about 92%, which is indicative of good carbohydrate recovery. These experiments demonstrated that the process was very reproducible, however, improvements in the capacity of the resin to remove phosphorus were still desirable.

TABLE 6

| Liters Through IEX Column | % Calcium Removed | % Phosphorus Removed | Calcium: Phosphorus Ratio |
|---|---|---|---|
| EXPERIMENT VIIIA - PROOF-OF-PRINCIPLE TRIAL 1 | | | |
| STARTING MATERIAL | — | — | 1.18 |
| 0.65 | 12.9% | 50.1% | 2.05 |
| 1.15 | 2.6% | 39.9% | 1.91 |
| 1.65 | 2.6% | 34.3% | 1.74 |
| 2.15 | 3.4% | 29.7% | 1.62 |
| 2.65 | 6.9% | 26.6% | 1.49 |
| 3.15 | 10.3% | 23.8% | 1.38 |
| Mean through 3.15 L | 6.5% | 34.1% | 1.70 |
| EXPERIMENT VIIIB - PROOF-OF-PRINCIPLE TRIAL 2 | | | |
| STARTING MATERIAL | — | — | 1.17 |
| 0.65 | 9.8% | 48.1% | 2.02 |
| 1.15 | 5.7% | 41.1% | 1.88 |
| 1.65 | 4.9% | 33.9% | 1.69 |
| 2.15 | 8.2% | 30.3% | 1.54 |
| 2.65 | 9.8% | 25.8% | 1.43 |
| 3.15 | 10.7% | 23.9% | 1.31 |
| Mean through 3.15 L | 8.2% | 33.9% | 1.65 |
| EXPERIMENT VIIIC - PROOF-OF-PRINCIPLE TRIAL 3 | | | |
| STARTING MATERIAL | — | — | 1.19 |
| 0.65 | 13.6% | 40.7% | 1.73 |
| 1.15 | 3.2% | 33.7% | 1.74 |
| 1.65 | 5.6% | 36.9% | 1.78 |
| 2.15 | 6.4% | 35.9% | 1.74 |
| 2.65 | 11.2% | 33.7% | 1.60 |
| 3.15 | 11.2% | 23.8% | 1.39 |
| Mean through 3.15 L | 8.5% | 34.1% | 1.66 |

EXPERIMENT IX

The effect of potassium citrate on phosphorus removal was studied in this experiment. The starting material was CSM diluted to 10% total solids with a solution of 10.8 g/l potassium citrate. The pH of this diluted CSM starting material was then adjusted to 6.2 with 0.1N hydrochloric acid. This starting material (4.65 liters) was then passed in a downflow mode at a flow rate of approximately 20 ml/min at 60° C. through the "IRA410" strong base anion exchange resin which had been conditioned with sodium hydroxide, hydrochloric acid, and sodium carbonate. Samples were collected at 500 ml intervals and were analyzed for calcium, phosphorus, and protein content.

Undesirable attributes of this process were immediately noted. Curdling of the CSM immediately occurred when the hydrochloric acid was added, even though it had been buffered with potassium citrate. Although column passage was not effected (pressure drop across the column never increased above 41 kPa (5 psig)), this curdled product would not be considered suitable for further use. The potassium citrate did aid in the removal of phosphorus, however, a significant reduction in calcium concentration also resulted as shown in Table 7. Protein content, particularly in the initial aliquot which decreased by over 27%, was below 90% through the run. It was decided to repeat this experiment with the hydrochloric acid pH adjustment added to the diluent water to determine if this would reduce the curdling problem and improve phosphorus removal, while leaving the calcium in the CSM.

TABLE 7
EXPERIMENT IX - EFFECT OF CITRATE

| Liters Through IEX Column | % Calcium Removed | % Phosphorus Removed | Calcium: Phosphorus Ratio |
| --- | --- | --- | --- |
| STARTING MATERIAL | — | — | 1.21 |
| 0.6 | 67.1% | 69.9% | 1.33 |
| 1.1 | 58.1% | 61.9% | 1.34 |
| 1.6 | 52.6% | 39.0% | 0.94 |
| 2.1 | 44.3% | 6.1% | 0.72 |
| 2.65 | 40.1% | 0% | 0.73 |
| 3.1 | 33.0% | 0% | 0.78 |
| 3.6 | 20.2% | 2.9% | 0.99 |

EXPERIMENT X

Experiment IX was repeated for Experiment X, with the exception of the manner in which the CSM starting material was buffered and diluted, and the pH lowered. Potassium citrate (81 g) was added to five liters of deionized water, and the pH was adjusted to 6.2 with hydrochloric acid. This solution was then added to 2.5 liters of CSM (resulting in diluted CSM at approximately 10% total solids). This starting material was then passed through the column and collected as in Experiment IX, and samples were analyzed for calcium, phosphorus, and protein content. Potassium was also analyzed to determine additive effects of potassium citrate. The results of these analyses are presented in Table 8.

No curdling of the low pH CSM was evident using this dilution technique. Pressure drop across the column was even lower than it had been previously (less than 41 kPa or 5 psig) through the entire 4.65 liter run. Potassium levels of CSM passed through the column remained about the same as those of the starting material (572–578 mg/100 g), indicating that the ion exchange column had no retentive effect on potassium. Although protein recovery improved, with greater than 90% recovery, significant calcium reduction occurred as the phosphorus level was reduced (Table 8). Based upon this unacceptable reduction in calcium, no further experiments were conducted involving potassium citrate.

TABLE 8
EXPERIMENT IX - EFFECT OF CITRATE

| Liters Through IEX Column | % Calcium Removed | % Phosphorus Removed | Calcium: Phosphorus Ratio |
| --- | --- | --- | --- |
| STARTING MATERIAL | — | — | 1.14 |
| 0.65 | 40.5% | 49.0% | 1.33 |
| 1.15 | 38.8% | 46.8% | 1.32 |
| 2.15 | 41.1% | 8.0% | 0.73 |
| 3.15 | 19.4% | +10% | 0.83 |

EXPERIMENT XI

This experiment was designed to employ two ion exchange columns in series to determine maximum removal capability of this ion exchange system type. Both columns contained 312 ml (0.011 cubic feet) of "IRA410" strong base anion exchange resin, gel type, conditioned with sodium hydroxide (1700 ml of 6%), hydrochloric acid (5 liters of 1%), and sodium carbonate (1 liter of 0.5%). All steps included appropriate intermediate water rinses to avoid osmotic shock to the ion exchange material(s). The starting material was condensed skim milk diluted to 10% total solids with deionized water. Five liters of the starting material were passed at 60° C. through the first column at a flow rate of approximately 20 ml/min. Sample aliquots from the first column were collected at 500 ml intervals, and the remaining effluent was fed into the second column at the same temperature and flow rate. Aliquots from the second column were collected at 500 ml intervals. Samples were then analyzed for calcium, phosphorus, and protein. Selected samples were also analyzed for chloride, sodium, potassium, and magnesium. Tables 9 and 10 present this analytical data.

Results from this two column system were very encouraging. Phosphorus removal from the initial column ranged from 37.3% to 1.9% in the final 500 ml aliquot. Phosphorus removal in the second column remained relatively constant, ranging from 41.7% to 34.2% throughout the run. Calcium content remained relatively constant through both columns. Magnesium content dropped slightly from 12.7 mg/100 g initially, to 9.2 mg/100 g after passage through the second column; and sodium and potassium contents were reduced, by an undetermined cause, through the two column run as compared to the results presented in Table 9 for Experiment XIA. Chloride level was elevated, however, from approximately 140 mg/100 g in the feed sample to approximately 260 mg/100 g after passage through the second column. Protein recoveries were excellent (averaging greater than 95%) through the two column system.

This experiment showed that the maximum phosphorus removal using this particular ion exchange methodology is approximately 40% of the total phosphorus in CSM. The technology seems to be very feasible commercially, with excellent protein recovery. However, the chloride concentration in the final product from this experiment was elevated to an unacceptable level. Experiment XII addressed this problem.

TABLE 9
EXPERIMENT XI - MAXIMUM PHOSPHORUS REMOVAL DETERMINATION

| Liters Through IEX Column | % Calcium Removed | % Phosphorus Removed | Calcium: Phosphorus Ratio |
| --- | --- | --- | --- |
| EXPERIMENT XIA - CSM THROUGH FIRST COLUMN | | | |
| STARTING MATERIAL | — | — | 1.19 |
| 0.35 | 12.4% | 37.3% | 1.66 |
| 0.85 | 7.8% | 30.7% | 1.76 |
| 1.45 | 10.1% | 34.2% | 1.63 |
| 2.05 | 10.1% | 35.2% | 1.66 |
| 2.65 | 7.8% | 33.3% | 1.65 |
| 3.25 | 10.9% | 33.3% | 1.60 |
| 3.85 | 11.6% | 31.5% | 1.54 |
| 4.45 | 11.6% | 14.8% | 1.24 |
| 5.05 | 10.1% | 1.9% | 1.09 |
| EXPERIMENT XIB - CSM THROUGH SECOND COLUMN | | | |
| STARTING MATERIAL* | — | — | 1.09 |
| 0.75 | 6.0% | 40.7% | 1.73 |
| 1.25 | 1.7% | 34.2% | 1.64 |
| 1.75 | 5.2% | 37.8% | 1.64 |
| 2.25 | 3.4% | 38.6% | 1.72 |
| 3.25 | 6.9% | 39.4% | 1.68 |
| 3.75 | 6.9% | 39.4% | 1.68 |
| 4.25 | 10.3% | 41.7% | 1.69 |

*STARTING MATERIAL for Column 2 was effluent from Column 1

TABLE 10

EXPERIMENT XI
COMPARISON OF MINERAL LEVELS IN CSM
BEFORE AND AFTER IEX TREATMENT

| Mineral | Before IEX (Starting Material) | After IEX (Effluent) |
|---|---|---|
| Calcium | 129 | 114 |
| Sodium | 49.1 | 45.0 |
| Potassium | 185 | 172 |
| Magnesium | 12.7 | 8.0 |
| Phosphorus | 108 | 69.5 |
| Chloride | 140 | 263 |

All data in mg/100 g. Expressed as diluted (10% total solids).

EXPERIMENT XII

This experiment was designed to lower the chloride level in the final CSM eluant. Since the chloride level increases because of the exchange of phosphorus for chloride on the anion exchange resin, a decrease in available chloride sites would be beneficial to reduce chloride exchange. To accomplish this, the concentration of the final sodium carbonate rinse in the conditioning cycle was increased from 8 kg/m$^3$ (0.5 pounds per cubic foot) of ion exchange material (as in Experiment XI) to 24kg/m$^3$ (1.5 pounds per cubic foot) of ion exchange material. All other column and feed parameters remained the same as in Experiment XI, however only a single column system was used. Aliquots were collected at 500 ml intervals and were analyzed for calcium, phosphorus, chloride, total solids and protein content. Selected samples were also analyzed for zinc, copper, and manganese to examine effects of the anion exchange column on these trace constituents. The results of these analyses are presented in Tables 11 and 12.

Good removal of phosphorus was once again observed for this run, with an average of 33.7% removal through 4.15 liters (Table 11). Although some drop in the levels of sodium, potassium, and magnesium was once again observed, it is at acceptable levels (Table 12). The minimal drop of trace metals is also acceptable. Protein recoveries were once again greater than 95%, which is excellent. Chloride levels were dramatically improved, with the increase from 140 mg/100 g in the feed, being an average of 146 mg/100 g in the final product throughout the run. The total solids recovered was greater than 90% which is indicative of good carbohydrate recovery.

The anion exchange process for the removal of phosphorus from CSM (mammalian milk) exhibits excellent phosphorus removal (35-40%) with excellent protein recovery of greater than 95%. The process does not significantly effect levels of other inherent minerals in CSM. The process is quick, uses environmentally friendly regenerant chemicals, and can be used on-line during processing.

TABLE 11

EXPERIMENT XII - CHLORIDE REDUCTION EXPERIMENT

| Liters Through IEX Column | % Calcium Removed | % Phosphorus Removed | Calcium: Phosphorus Ratio |
|---|---|---|---|
| STARTING MATERIAL | — | — | 1.19 |
| 0.65 | 26.2% | 46.6% | 1.65 |
| 1.15 | 7.7% | 31.7% | 1.61 |
| 1.65 | 10.0% | 33.2% | 1.61 |
| 2.15 | 10.8% | 33.1% | 1.59 |
| 2.65 | 6.2% | 30.2% | 1.60 |
| 3.15 | 5.4% | 30.4% | 1.62 |
| 3.65 | 8.5% | 30.4% | 1.57 |
| 4.15 | 19.2% | 30.9% | 1.39 |

TABLE 12

EXPERIMENT XII
COMPARISON OF MINERAL LEVELS IN CSM
BEFORE AND AFTER IEX TREATMENT

| Mineral | Before IEX (Starting Material) | After IEX (Effluent) | % Loss Through IEX |
|---|---|---|---|
| Calcium | 130 | 96.0 | 26.2% |
| Sodium | 50.9% | 39.1 | 23.2% |
| Potassium | 178 | 141 | 20.8% |
| Magnesium | 13.0 | 7.80 | 40.0% |
| Phosphorus | 109 | 58.2 | 46.6% |
| Chloride | 140 | 147 | — |
| Zinc | 0.444 | 0.327 | 26.4% |
| Copper | <0.07 | <0.07 | — |
| Manganese | <0.03 | <0.03 | — |

All data in mg/100 g. Expressed as diluted (10% total solids).

Although as shown in Table XII there is some loss of nutrients during the ion exchange process, this is not believed to be detrimental because the end use of the reduced phosphorus milk is as an ingredient in a nutritional product. It is a common practice, for example, in the infant formula industry to add these same "lost" nutrients to the product to achieve desired levels of these nutrients even when commercially available skim milk is used an ingredient. The amounts of these nutrients added to the product may be easily adjusted while still enjoying the lower phosphorus content of the ion exchange treated mammalian (bovine) milk.

EXPERIMENT XIII

Five scale up experiments (XIII through XVII) were conducted in a stainless steel water jacketed column with dimensions of 132 cm (52 inches) in length and 8.3 cm (3.25 inches) in diameter. The overall functionality and operation of the column is identical to the glass column described above. The column was loaded with 4 liters of resin and regenerated such that a minimum contact time of thirty minutes was achieved with each chemical regeneration step (as previously described). The column was equipped with an inlet port located at the top of the column and an outlet port located at the bottom of the column, which allowed the downflow passage of mammalian milk through the ion exchange resin bed at a flow rate of 250-270 ml/min. A water jacket in the form of a copper coil wound around the exterior of the stainless steel column provided a constant flow of recirculating warm water in order to maintain the product feed temperature through the resin bed.

The regeneration sequence for the ion exchange resin was always performed in a downflow mode at a flow rate such that the resin was in contact with each regenerant chemical for a minimum of thirty minutes. Since deionized water was not available for the experiments, soft water was used for all slow rinses, fast rinses, and backwash procedures. Soft water was supplied from a water softening unit filled with Rohm and Haas Amberlite IRA 120 ion exchange resin (sodium cycle). As in previous laboratory scale experiments, all fast rinse cycles following the 15 minute slow rinse cycle were completed when the effluent conductivity of water was measured at 200 micromhos or less. In these particular experiments, the endpoint value for conductivity varied between 200-300 micromhos because the soft water itself had a conductivity of 200-300 micromhos.

All feed and effluent samples were collected at thirty minute intervals during the service cycle and were analyzed for total solids, protein content, and mineral levels. Mineral concentrations were determined using atomic absorption spectrophotometry and inductively coupled argon plasma spectroscopy. Protein determinations were performed using a Tecator Kjeldahl protein method similar to AOAC method 984.27. Chloride levels were determined using a metrohm potentiometric method or x-ray fluorescence spectroscopy. Total solids were determined using Mojonnier techniques.

The first experiment was conducted to evaluate potassium hydroxide (instead of sodium hydroxide) as a regenerant and its effect on phosphorous reduction. Four liters of strong base anion exchange resin, Amberlite IRA-410 from Rohm & Haas were loaded into the stainless steel column. The resin was regenerated with 11 liters of 6% potassium hydroxide (1020 ml of 45% KOH diluted to 11 liters of soft water) at a flow rate of 250 ml/min followed by a 20 minute soft water slow rinse. The resin was then fast rinsed to a conductivity of 300 micromhos. Following the caustic conditioning step a 1% hydrochloric acid solution (750 ml of 37% HCL diluted to 33 liter with soft water) was pumped through the column at a flow rate of 1000 ml/min in order to achieve a contact time of at least thirty minutes. A slow rinse was then initiated for 15 minutes with soft water followed by a fast rinse to an endpoint conductivity of 300 micromohos. The resin was neutralized with a 1.5% sodium carbonate solution (165 g of $Na_2CO_3$) dissolved in 11 liters of soft water) at a flow rate of 280 ml/min. A slow and fast rinse was performed as described in the previous regeneration steps. Prior to the service cycle, the column was preheated to a temperature of 140° F. by circulating hot water through the copper coil water jacket.

The starting feed material for all of the scale-up experiments was obtained by diluting raw condensed skim milk (CSM) with soft water to a concentration yielding approximately 10% total solids and 3.5% protein, with a pH value of 6.6. The raw CSM consisted of approximately 30% total solids and 10% protein. The diluted CSM was maintained at 60° C. in a steam-jacketed stainless steel kettle throughout the course of the experiment. The feed CSM was pumped in a downflow mode through the jacketed column at a flow rate of 250-270 ml/min for two hours. Effluent samples were collected at half hour intervals and submitted for testing. The initial effluent appeared clear, but the later samples that were collected gradually became milky in color. An undesirable odor was also noted in all effluent samples. The conductivity of the effluent samples increased throughout the run, whereas the pH decreased. The average pH of the samples collected in the two hour period was 9.83. No significant pressure increases were observed throughout the experiment.

Total solids and total protein analyses indicated that a 92.5% recovery in total solids and a 99.1% recovery in protein was achieved. Mineral results in Table 13 show that phosphorus levels were reduced by an average of 35.5%. Consequently, the ratio of calcium to phosphorus in the CSM increased from 1.21 to 1.69 after ion exchange treatment.

The level of $Na_2CO_3$ introduced in the neutralization step was lower than required. The appropriate amount should be 192 g of $Na_2CO_3$ dissolved in 12.5 liters of soft water instead of 165 g in 11 liters of dissolved in 12.5 liters of soft water instead of 165 g in 11 liters of soft water. Later experiments using sodium carbonate were corrected to the appropriate levels.

TABLE 13

EXPERIMENT XIII - EFFECT OF POTASSIUM HYDROXIDE REGENERATION ON PHOSPHORUS REMOVAL

| Liters Through IEX Column | % Calcium Removed | % Phosphorus Removed | Calcium: Phosphorus Ratio |
|---|---|---|---|
| STARTING MATERIAL | — | — | 1.21 |
| 7.5 | 34.6%* | 55.2%* | 1.76 |
| 15.0 | 6.6% | 32.6% | 1.67 |
| 22.5 | 3.3% | 33.5% | 1.76 |
| 30.0 | 9.8% | 35.3% | 1.68 |
| 37.5 | 11.5% | 35.1% | 1.65 |
| MEAN THRU 37.5 L | 9.8% | 35.5% | 1.69 |

*Sample collected after 7.5 liters was dilute. Thus, removal appears higher because total solids are lower.
**Resin used: IRA 410

EXPERIMENT XIV

This experiment was conducted using the same resin as Experiment XIII (IRA 410) to evaluate the removal of phosphorus from CSM using a 1% sulfuric acid solution instead of hydrochloric acid. Again, four liters of strong base anion exchange resin, IRA-410, was regenerated in the following manner: The resin was first conditioned with 11 liters of 6% sodium hydroxide (870 ml of 50% NaOH diluted to 11 liters with soft water) under the same process conditions as Experiment XIII. The resin was then regenerated with 33 liters of 1% sulfuric acid solution (344 g of 96% $H_2SO_4$ diluted to 33 liter with soft water). After the slow and fast rinses, a total of 12.5 liters of a 1.5% sodium carbonate solution (192 g of $Na_2CO_3$ dissolved in 12.5 liter of soft water) was passed through the column for neutralization. Slow and fast rinses were performed between all regeneration steps, and a final backwash was performed after the final neutralization step prior to the service cycle. As described in Experiment XIII, the column was preheated and maintained at a temperature of 60° C.

The diluted feed CSM (approximately 10% total solids, 3.4% protein and pH of 6.56) was heated to a temperature of 60° C. in the steam jacketed kettle and pumped down flow through the column at a flow rate of 250-270 ml/min for two hours. The temperature of the column and feed CSM was maintained at 60° C. throughout the entire experiment. Samples were collected at half hour intervals.

Several observations were made in this experiment. The effluent samples collected had an uncharacteristically bad odor, similar to that noted in Experiment XIII. The first three effluent samples that were collected in ninety minutes were clear in color. The fourth sample was milky with a yellowish tint.

Excellent yields of 93.3% recovery on total solids and a 96.0% recovery on protein were obtained in this experiment. Table 14 shows that phosphorous was reduced by 32.3% and that the ratio of calcium to phosphorus in the CSM improved from 1.18 initially to 1.61 after ion exchange treatment.

It was noted that the amount of sulfuric acid introduced in the acid conversion regeneration step was twice the amount required. The appropriate level of acid is 172 grams of 96% $H_2SO_4$ diluted to 16.5 liter with soft water instead of 344 grams diluted to 33 liters.

TABLE 14

EXPERIMENT XIV - EFFECT OF SULFURIC ACID REGENERATION ON PHOSPHOROUS REMOVAL

| Liters Through IEX Column | % Calcium Removed | % Phosphorus Removed | Calcium: Phosphorus Ratio |
|---|---|---|---|
| STARTING MATERIAL | — | — | 1.18 |
| 7.5 | 60.3%* | 71.6%* | 1.65 |
| 15.0 | 9.8% | 32.9% | 1.59 |
| 22.5 | 3.3% | 30.4% | 1.65 |
| 30.0 | 2.5% | 28.7% | 1.62 |
| 37.5 | 0.8% | 25.0% | 1.57 |
| MEAN THRU 37.5 L | 8.2% | 32.3% | 1.61 |

*Sample collected after 7.5 liters was dilute. Thus, removal appears higher because total solids are lower.
**Resin used: IRA 410

EXPERIMENT XV

This experiment was conducted using IRA 410 resin (same as in Experiments XIII and XIV) to evaluate the effectiveness of sodium bicarbonate neutralization on phosphorus removal from CSM. The process conditions for this experiment were kept exactly the same as those used in Experiments XIII and XIV. The resin was first conditioned with 11 liters of 6% sodium hydroxide solution (870 ml of 50% NaOH diluted to 11 liters with soft water). After slow and fast rinses, 33 liters of a 1% hydrochloric acid solution (750 ml of 37% HCl diluted to 33 liter with soft water) was passed through the resin bed. In the final neutralization step, the resin was conditioned with 12.5 liters of 1.5% sodium bicarbonate solution (192 g of $NaHCO_3$ dissolved in 12.5 liter of soft water).

The diluted feed CSM (approximately 10% total solids, 3.4% protein and pH at 6.55) was heated to a temperature of 60° C. in the steam jacketed kettle and pumped in a downflow mode through the column at a flow rate of 250–270 ml/min for two hours. The temperature of the column and feed CSM was maintained at 60° C. throughout the entire experiment. Samples were collected at half hour intervals.

Several interesting observations were made in this experiment. Unlike the samples collected in Experiment XIV using sulfuric acid, the effluent samples in this particular experiment did not exhibit any uncharacteristic odor and all samples appeared milky, like the feed CSM. One interesting phenomenon was that all of the samples collected had relatively low pH values, ranging from 7.0–7.7. The average pH of the samples collected over the two hour period was 7.26. In previous experiments using sodium carbonate, higher pH's were observed, which could be associated with the undesirable odors noted in Experiments XIII and XIV.

A 96.5% recovery on total solids and a 99.1% recovery on protein was achieved in this experiment. Mineral analyses (Table 15) showed a 97.5% recovery in calcium and a 37.4% reduction in phosphorus. Table 15 shows the ratio of calcium to phosphorus in the CSM increased from 1.19 initially to 1.85 after ion exchange treatment. This ratio of 1.85 to 1 was significantly higher than any of the other previous experiments. This implies that a weaker base such as sodium bicarbonate is more than equally effective as a regenerant for neutralization. Furthermore, the sodium bicarbonate yielded a lower overall effluent pH, which is highly desirable for use in nutritional products.

TABLE 15

EXPERIMENT XV - EFFECT OF SODIUM BICARBONATE REGENERATION ON PHOSPHORUS REMOVAL

| Liters Through IEX Column | % Calcium Removed | % Phosphorus Removed | Calcium: Phosphorus Ratio |
|---|---|---|---|
| STARTING MATERIAL | — | — | 1.19 |
| 7.5 | 41.8%* | 65.5%* | 2.00 |
| 15.0 | 2.5% | 39.5% | 1.91 |
| 22.5 | 1.7% | 36.3% | 1.84 |
| 30.0 | 0.8% | 34.0% | 1.78 |
| 37.5 | 0.0% | 30.6% | 1.73 |
| MEAN THRU 37.5 L | 2.5% | 37.4% | 1.85 |

*Sample collected after 7.5 liters was dilute. Thus, removal appears higher because total solids are lower.
**Resin used: IRA 410

EXPERIMENT XVI

This experiment was conducted to evaluate potassium carbonate for neutralization and its effect on phosphorus removal from CSM. The resin was first regenerated with 11 liters of 6% sodium hydroxide solution (870 ml of 50% NaOH diluted to 11 liters with soft water). After slow and fast rinses, the resin was conditioned with 33 liters of 1% hydrochloric acid solution (750 ml of 37% HCl diluted to 33 liter with soft water), and finally conditioned with 12.5 liters of 1.5% potassium carbonate solution (192 g of $K_2CO_3$ dissolved in 12.5 liter of soft water).

The diluted feed CSM (approximately 10% total solids, 3.4% protein, and a pH of 6.53) was maintained at 60° C. and fed in a downflow mode through the column at a flow rate of 250–270 ml/min for two hours. As before, effluent samples were collected at half hour intervals.

Several observations were noted from this experiment. The first sample was clear in appearance as later samples gradually became milky. Like previous experiments, the conductivity of the samples increased throughout the run while pH decreased. The average pH of the collected samples over a two hour period was very high at approximately 9.77. As seen in previous experiments where high effluent pH's were encountered, an undesirable odor was noted throughout this experiment.

A 95.9% recovery in total solids and nearly 100% recovery in protein was obtained from this experiment. As shown in Table 16, a 93.5% recovery in calcium was achieved while phosphorus was reduced by 34.2%. The ratio of calcium to phosphorus in the CSM increased from 1.19 to 1.70 after ion exchange treatment.

TABLE 16

EXPERIMENT XVI - EFFECT OF POTASSIUM CARBONATE REGENERATION ON PHOSPHOROUS REMOVAL

| Liters Through IEX Column | % Calcium Removed | % Phosphorus Removed | Calcium: Phosphorus Ratio |
|---|---|---|---|
| STARTING MATERIAL | — | — | 1.19 |

TABLE 16-continued

EXPERIMENT XVI - EFFECT OF POTASSIUM CARBONATE REGENERATION ON PHOSPHOROUS REMOVAL

| Liters Through IEX Column | % Calcium Removed | % Phosphorus Removed | Calcium: Phosphorus Ratio |
|---|---|---|---|
| 7.5 | 25.5%* | 48.3%* | 1.72 |
| 15.0 | 4.9% | 32.3% | 1.68 |
| 22.5 | 3.3% | 34.0% | 1.75 |
| 30.0 | 8.1% | 35.0% | 1.69 |
| 37.5 | 4.9% | 31.6% | 1.66 |
| MEAN THRU 37.5 L | 6.5% | 34.2% | 1.70 |

*Sample collected after 7.5 liters was dilute. Thus, removal appears higher because total solids are lower.
**Resin used: IRA 410

EXPERIMENT XVII

In this experiment a different resin, Amberlite IRA-400 from Rohm and Haas, a type I resin, were loaded into the column to evaluate its effectiveness in removing phosphorus from CSM. Four liters of the strong base anion exchange resin was loaded and first conditioned with 11 liters of 6% sodium hydroxide solution (870 ml of 50% NaOH diluted to 11 liters with soft water). Next, 33 liters of 1% hydrochloric acid solution (750 ml of 37% HCl diluted to 33 liters with soft water) was passed downflow through the resin bed. After slow and fast rinses, the resin was finally conditioned with 12.5 liters of 1.5% sodium carbonate solution (192 g of $Na_2CO_3$ dissolved in 12.5 liters of soft water). The process conditions used were identical to the experiments XIII through XVI.

The diluted feed CSM (approximately 10% total solids, 3.4% protein and pH 6.56) was maintained at 60° C. in the kettle and pumped downflow through the jacketed column at a flow rate of 250–270 ml/min for two hours. Several observations were made in this experiment including the first sample appearing clear in color and later samples gradually becoming creamy or milk-like. The last sample collected was yellow in color. As in previous experiments using carbonate salt forms, the average pH of the effluent samples collected over the two hour period was very high at about 9.86. Likewise, an undesirable odor was noted, probably associated with the higher pH.

As in previous experiments, excellent recoveries in total solids and protein were obtained (93.1% and 98.2%, respectively). As shown in Table 16, good calcium recovery was achieved at 93.2% and phosphorus was reduced significantly by 31.3%. Consequently, the overall calcium to phosphorus ratio increased from 1.20 to 1.62 after ion exchange treatment.

TABLE 17

EXPERIMENT XVII - EFFECT OF AMBERLITE IRA 400 (TYPE I) RESIN ON PHOSPHORUS REMOVAL

| Liters Through IEX Column | % Calcium Removed | % Phosphorus Removed | Calcium: Phosphorus Ratio |
|---|---|---|---|
| STARTING MATERIAL | — | — | 1.20 |
| 7.5 | 28.6%* | 47.7%* | 1.64 |
| 15.0 | 7.6% | 30.6% | 1.59 |
| 22.5 | 1.7% | 29.2% | 1.66 |
| 30.0 | 5.1% | 32.2% | 1.68 |
| 37.5 | 5.1% | 28.2% | 1.58 |
| MEAN THRU 37.5 L | 6.8% | 31.3% | 1.62 |

*Sample collected after 7.5 liters was dilute. Thus, removal appears higher because total solids are lower.

While the preferred ion exchange materials for practicing the present invention are strong base anion exchange resins, Type II, macroporous and gels, because these materials are more appropriate for use with food products, it is recognized that the chemistry of strong base anion exchange resins, Type I, macroporous and gels, make these ion exchange materials suitable for use in practicing the present invention.

These scale-up experiments (XIII through XVI) using various regenerant chemicals and resins have shown that phosphorus in CSM can be consistently reduced by 31–37% without sacrificing calcium and overall protein content using the aforementioned process conditions. All five scale-up experiments yielded excellent recoveries of total solids (in excess of 90%) and total protein (more than 95%). Furthermore, all of the scale-up experiments showed a dramatic improvement in the ratio or calcium to phosphorus in the CSM after ion exchange treatment. Out of the five scale-up experiments, Experiment XV, which utilized sodium bicarbonate neutralization, produced the best results in terms of phosphorus reduction (37%), calcium to phosphorus ratio (1.85), and overall quality for use in a finished product.

In regards to the conditioning, or reconditioning, of the ion exchange material used in the removal of phosphorous from mammalian milk, it may be summarized as being basically a three-step process. In the first step the ion exchange material is brought into contact with an agent, such as sodium hydroxide or potassium hydroxide, which strips the ion exchange material of residue and converts the ion exchange material to a hydroxide form, followed by a water rinse. In the second step the ion exchange material is brought into contact with an agent, such as hydrochloric acid or sulfuric acid, which converts the ion exchange material to either a chloride form or a sulfate form, followed by a water rinse. In the third step the ion exchange material is brought into contact with an agent, such as sodium carbonate or sodium bicarbonate, which converts the weak base anion sites to a free base form, followed by a water rinse.

While certain representative embodiments and details have been presented for the purpose of illustrating the invention, it will be apparent to those skilled in the art that various changes and modifications may be made therein without departing from the spirit or scope of the invention.

We claim:

1. A method of removing phosphorous from mammalian milk comprising the steps of:
   (a) providing at least one ion exchange material selected from the group consisting of (i) strong base anion exchange resins, Type I, macroporous and gels, and (ii) strong base anion exchange resins, Type II, macroporous and gels, said ion exchange material having strong base anion sites and weak base anion sites and having been conditioned by:

(i) bringing the ion exchange material into contact with an agent which strips surfaces of the ion exchange material of residue and converts the ion exchange material to a hydroxide form, following which the ion exchange material is rinsed with water, (ii) thereafter bringing the ion exchange material into contact with an agent which converts the ion exchange material to either a chloride form or a sulfate form, following which the ion exchange material is rinsed with water, and (iii) thereafter bringing the ion exchange material into contact with an agent which converts the weak base anion sites to a free base form, following which the ion exchange material is rinsed with water;

(b) providing mammalian milk which contains phosphorus;

(c) bringing the mammalian milk into contact with the ion exchange material; and (d) thereafter separating the mammalian milk from the ion exchange material.

2. A method of removing phosphorous from mammalian milk according to claim 1 wherein step (c) comprises placing the ion exchange material in the mammalian milk.

3. A method of removing phosphorous from mammalian milk according to claim 1 wherein steps (c) and (d) comprise passing the mammalian milk through a structure which contains the ion exchange material and has at least one inlet port and one outlet port.

4. A method of removing phosphorous from mammalian milk according to claim 3 wherein the structure is a substantially vertical column.

5. A method of removing phosphorous from mammalian milk according to claim 4 wherein the mammalian milk enters the column via said inlet port and exits the column via said outlet port, with the inlet port being located lower than the outlet port.

6. A method of removing phosphorous from mammalian milk according to any one of claims 1–5 wherein the mammalian milk is at a temperature of at least 60° C. during step (c).

7. A method of removing phosphorus from mammalian milk according to any one of claims 1–5 wherein the agent employed in step (a)(i) is selected from the group consisting of sodium hydroxide and potassium hydroxide.

8. A method of removing phosphorus from mammalian milk according to any one of claims 1–5 wherein the agent employed in step (a)(ii) is selected from the group consisting of hydrochloric acid and sulfuric acid.

9. A method of removing phosphorous from mammalian milk according to any one of claims 1–5 wherein the agent employed in step (a)(iii) is selected from the group consisting of sodium carbonate and sodium bicarbonate.

10. A method of removing phosphorous from mammalian milk according to any one of claims 1–5 wherein the mammalian milk provided in step (b) is bovine milk.

11. A method of removing phosphorous from mammalian milk according to any one of claims 1–5 wherein the mammalian milk provided in step (b) is bovine skim milk.

12. A method of removing phosphorous from bovine skim milk comprising the steps of:

(a) providing a column which has an inlet port and outlet port, said column containing an ion exchange material selected from the group consisting of Type II macroporous strong base anion exchange resins and Type II gel type strong base anion exchange resins, said ion exchange material having been conditioned by:

(i) rinsing the ion exchange material with an agent selected from the group consisting of sodium hydroxide and potassium hydroxide, following which the ion exchange material is rinsed with water, (ii) thereafter rinsing the ion exchange material with an agent selected from the group consisting of hydrochloric acid and sulfuric acid, following which the ion exchange material is rinsed with water, and (iii) thereafter rinsing the ion exchange material with an agent selected from the group consisting of sodium carbonate and sodium bicarbonate, following which the ion exchange material is rinsed with water;

(b) providing bovine skim milk which contains phosphorous; and (c) causing the bovine skim milk to enter said column via the inlet port, contact the ion exchange material, and exit the column via the outlet port.

13. A method of removing phosphorous from bovine skim milk according to claim 12 wherein the bovine skim milk is at a temperature of at least 60° C. during step (c).

* * * * *